US012009572B2

(12) United States Patent
Coffy et al.

(10) Patent No.: US 12,009,572 B2
(45) Date of Patent: Jun. 11, 2024

(54) ANTENNA PACKAGE

(71) Applicants: STMicroelectronics (Grenoble 2) SAS, Grenoble (FR); STMicroelectronics (Alps) SAS, Grenoble (FR)

(72) Inventors: Romain Coffy, Voiron (FR); Georg Kimmich, Saint-Marcellin (FR)

(73) Assignees: STMicroelectronics (Grenoble 2) SAS, Grenoble (FR); STMicroelectronics (Alps) SAS, Grenoble (FR)

(*) Notice: Subject to any disclaimer, the term of this patent is extended or adjusted under 35 U.S.C. 154(b) by 51 days.

(21) Appl. No.: 17/742,039

(22) Filed: May 11, 2022

(65) Prior Publication Data

US 2022/0376379 A1 Nov. 24, 2022

(30) Foreign Application Priority Data

May 18, 2021 (FR) ...................................... 2105186

(51) Int. Cl.

| | |
|---|---|
| ***H01Q 1/22*** | (2006.01) |
| ***H01Q 1/38*** | (2006.01) |
| ***H01Q 1/42*** | (2006.01) |
| ***H01Q 13/18*** | (2006.01) |

(52) U.S. Cl.

CPC ............. *H01Q 1/2283* (2013.01); *H01Q 1/38* (2013.01); *H01Q 1/422* (2013.01); *H01Q 13/18* (2013.01)

(58) Field of Classification Search

CPC ........ H01Q 1/2283; H01Q 1/38; H01Q 1/422; H01Q 13/18; H01Q 9/0407

See application file for complete search history.

(56) References Cited

U.S. PATENT DOCUMENTS

| | | | | |
|---|---|---|---|---|
| 2010/0190464 A1 | 7/2010 | Chen et al. | | |
| 2016/0049723 A1 | 2/2016 | Baks et al. | | |
| 2019/0036202 A1* | 1/2019 | Caratelli | ................ | H01Q 1/246 |
| 2020/0161766 A1* | 5/2020 | Liu | ........................ | H01Q 9/045 |

OTHER PUBLICATIONS

INPI Search Report and Written Opinion for priority application, FR 2105186, report dated Dec. 3, 2021, 9 pgs.

* cited by examiner

*Primary Examiner* — David E Lotter

(74) *Attorney, Agent, or Firm* — Crowe & Dunlevy LLC

(57) ABSTRACT

A package includes an upper level mounted to a lower level. The upper level includes a stack formed by insulating layers and conductive elements and includes a first conductive track of an antenna. A plastic element rests on the stack. A first cavity is defined in the plastic element. A second conductive track of the antenna is located on a wall of the plastic element (for example, in or adjacent to the first cavity). A second cavity is also defined in the plastic element surrounding the first cavity. A third conductive track of the antenna is located on a wall of the plastic element (for example, in the second cavity). A third cavity is delimited between the upper and lower levels and an integrated circuit chip is mounted within the third cavity and electrically connected to the antenna.

43 Claims, 4 Drawing Sheets

ANTENNA PACKAGE

PRIORITY CLAIM

This application claims the priority benefit of French Application for Patent No. 2105186, filed on May 18, 2021, the content of which is hereby incorporated by reference in its entirety to the maximum extent allowable by law.

TECHNICAL FIELD

The present disclosure relates generally to electronic devices and, in particular, to devices comprising an antenna located in a package and their manufacturing methods.

BACKGROUND

An antenna is an element for transmitting (transmitter) or receiving (receiver) electromagnetic waves. The antenna is a fundamental element in a radio system.

SUMMARY

One embodiment provides a package comprising, in an upper level, a stack comprising insulating layers and conductive elements; an element, made of plastic, resting on the stack, and defining a first cavity; and an antenna, comprising a first conductive track in the stack and a second conductive track on a sidewall of the first cavity of the element.

Another embodiment provides a method for manufacturing a package comprising, in order to form an upper level: forming a stack comprising insulating layers and conductive elements and comprising a first conductive track forming part of an antenna; forming an element, made of plastic, resting on the stack, and defining a first cavity between the element and the stack; and forming a second conductive track resting on a wall of the element.

According to one embodiment, the first cavity is filled with a first material having a dielectric permittivity less than 20.

According to one embodiment, the package defines a second cavity surrounding the first cavity.

According to one embodiment, the second cavity is separated from the first cavity by a wall extending the full height of the first cavity and resting on the stack.

According to one embodiment, the second cavity comprises a third conductive track extending along at least one sidewall of the second cavity.

According to one embodiment, the third conductive track comprises a first portion extending on a second wall of the element, from the stack, and a second portion extending on the bottom of the second cavity.

According to one embodiment, the second portion of the third conductive track is coplanar with the plane of the second conductive track.

According to one embodiment, the second portion of the third conductive track extends in a plane different from the plane of the second conductive track.

According to one embodiment, the third conductive track is electrically coupled to the first conductive track.

According to one embodiment, the second cavity is filled with a second material different from the first material filling the first cavity.

According to one embodiment, the method comprises, after forming element, filling the first and second cavities with the first and second materials, respectively.

According to one embodiment, the package comprises a lower level attached to the upper level and defining, between the upper level and the lower level, a third cavity.

According to one embodiment, the package comprises a fourth conductive track extending into the stack between the first conductive track and the third cavity.

According to one embodiment, the element is made of a thermoplastic material, doped with a non-conductive inorganic metal compound.

According to one embodiment, the element is formed by a laser direct structuring method.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional, and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
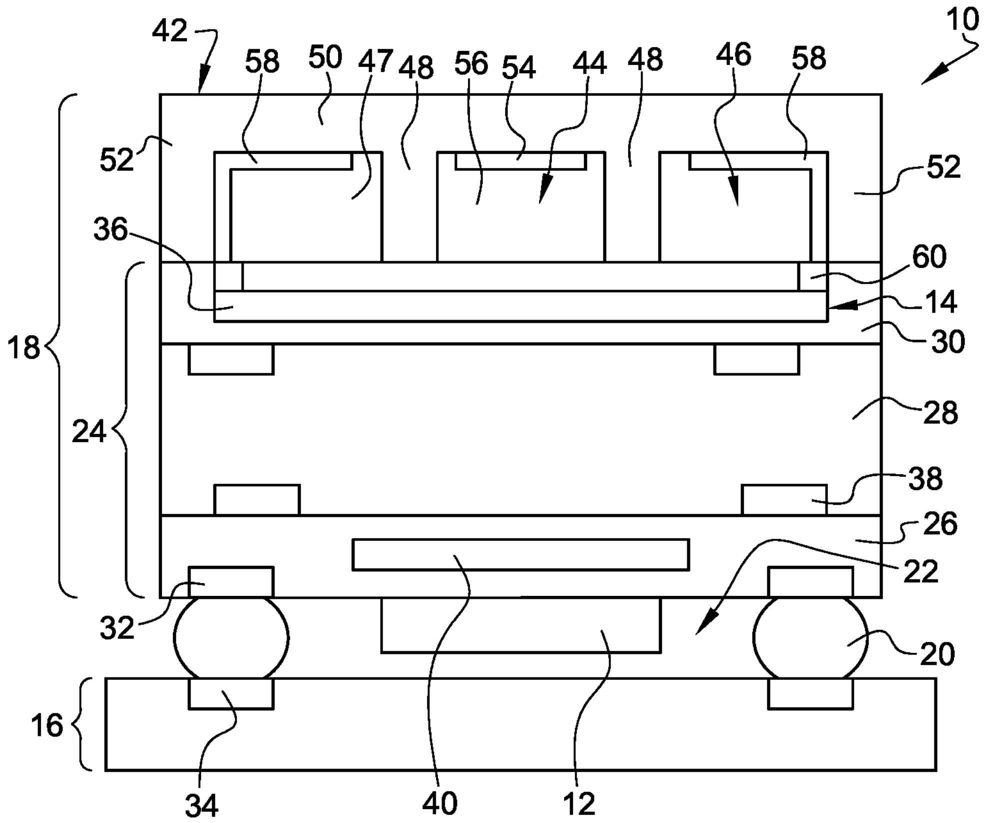
FIG. 1 is a cross-sectional view of one embodiment of an electronic device.

FIG. 1 is a cross-sectional view of one embodiment of an electronic device 10. The device 10 is an antenna device, more specifically an antenna in package ("AiP").

The device 10 comprises an integrated circuit chip 12. The chip 12 is located in the package. The chip 12 is thus protected by the package. An antenna 14 is coupled to the chip 12 so as to allow the chip to transmit or receive signals through the antenna 14.

The package comprises, for example, a support (lower level) 16. The support 16 is, for example, a semiconductor substrate, comprising, for example, electronic components, or a stack of insulating layers comprising conductive tracks.

The package further comprises an upper level 18. The upper level 18 and the lower level 16 are attached to each other by conductive elements 20. For example, the upper level 18 and the lower level 16 are soldered together by solder balls, forming sidewalls of the package. The solder balls allow, for example, the electrical connection of the lower level with the upper level. A cavity 22, in which the chip 12 is located, is thus defined between the lower and upper levels, and inside a metal ring formed by the conductive elements 20.

Alternatively, the chip 12 may be located at another position in the package. For example, the chip 12 may be located in the stack 24, in other words, consisting of the layers of the stack 24.

The upper level 18 comprises a stack 24 of layers. The stack 24 constitutes, for example, an interconnect network comprising insulating layers and conductive tracks. For example, the stack 24 comprises insulating layers, or dielectric layers, for example of different dielectric materials. For example, the stack 24 comprises lower layers 26, i.e., closest to the lower level 16, of a first dielectric material. The stack 24 comprises intermediate layers 28, resting on the layers 26 of a second dielectric material. The second material is preferably different from the first material. The stack 24 comprises upper layers 30, resting on the layers 28 of, for example, the first dielectric material.

The stack 24 comprises, for example, metal studs 32 flush with the underside of the insulating layer closest to the support 16, i.e., the layer closest to the cavity 22. The support 16 comprises, flush with its upper face, i.e. the face closest to the cavity 22, metal studs 34 located opposite the studs 32. The studs 32 and 34 allow the electrical connection of the upper and lower levels via the balls 20. For example, a ball 20 is located between each stud 32 and the corresponding stud 34.

The antenna 14 comprises an antenna structure, comprising for example one or more metal layers 36, or metal tracks, in the stack 24, preferably between the upper layers 30. In the example shown in FIG. 1, only one layer 36 is shown. The layer 36 is, for example, coupled to the chip 12 via the conductive tracks 38 located in the stack 24. This allows the chip 12 to excite the layer 36 so as to transmit or receive signals. The layer 36 is, for example, also coupled to ground, for example via the tracks 38.

The stack 24 comprises, for example, surrounded by lower layers 26, a metal track 40 extending opposite the chip 12, preferably opposite the entire chip 12. The track 40 forms a protective shield for the chip 12. The track 40 is located between the layer 36 and the chip 12. According to another embodiment, in which the chip 12 is not located opposite the layer 36, the track 40 may be absent.

The upper level 18 further comprises an upper element 42. The element 42 rests on the stack 24. The element 42 comprises a base 50. The base 50 is, for example, planar. The base 50 extends opposite the stack 24, preferably opposite the entire stack 24. The element 42 further comprises walls 48 and 52. The walls 48 and 52 are located between the base 50 and the stack 24. More specifically, the base 50 rests on the walls 48 and 52. The base is thus supported by the walls 48 and 52 and the walls 48 and 52 rest on the stack 24.

The element 42 is made of a plastic material. For example, the element 42 is made of a thermoplastic material, for example, doped with a non-conductive metallic inorganic compound. The element 42 is, for example, made of an epoxy-based hard plastic. The element 42, comprises the base 50 and the walls 48 and 52, and is preferably formed as a single unit, constituting a cover.

The element 42 defines an internal cavity 44. The cavity 44 is, once the element 42 is attached to the stack, a closed cavity, i.e., a cavity surrounded on all sides. The cavity 44 is preferably central. The cavity 44 preferably faces the protective layer 40. The layer 40 is preferably between the chip 12 and the cavity 44. The cavity 44 preferably faces layer 36.

The cavity 44 is delimited in a first direction, for example, the vertical direction, by the base 50 and the stack 24 and in a plane orthogonal to the first dimension, for example the horizontal plane, by the wall 48. The base 50 forms the bottom of the cavity. The wall 48 surrounds the cavity 44.

In the embodiment of FIG. 1, the element 42 further defines an enclosed cavity 46. The cavity 46 preferably extends around the cavity 44. The cavity 46 preferably forms a ring surrounding the cavity 44. The cavity 46 is separated from the cavity 44 by the wall 48.

The cavity 46 is delimited in the first direction, for example, the vertical direction, by the base 42 and the stack 24 and, in a plane orthogonal to the first dimension, for example the horizontal plane, by the wall 48 and the wall 52. The wall 52 surrounds the cavity 46. The base 50 forms the bottom of the cavity. The cavity 46 surrounds the wall 48. The wall 52 thus forms an outer sidewall of the element 42. The wall 52 is preferably coplanar with the sidewalls of the stack 24.

In the example of FIG. 1, the base 50 has a substantially constant thickness. Thus, according to the embodiment of FIG. 1, the cavities 44 and 46 are substantially equal in height.

The element 42 is attached to the stack 24. For example, the element 42 is attached to the stack 24 by a layer of adhesive not represented.

The antenna 14 comprises, in addition to the layer 36, a conductive layer, or track, (patch) 54 located on the base 50 in the cavity 44. The layer 54 is preferably made of metal. The layer 54 is located opposite a portion of the layer 36, or more generally the set of layers 36 forming the excitation portion of the antenna. The layer 54 allows to transmit the signal of the antenna, obtained by the excitation of the layer 36. The layer 54 is electrically isolated, in particular from the layer 36. In other words, the layer 54 is not in contact with any conductive element and in particular is not electrically coupled with the layer 36.

The antenna 14 comprises, according to the embodiment of FIG. 1, a secondary part, conductive layer or track, 58, participating in the excitation of the antenna. The secondary portion 58 is preferably a metal layer, preferably of the same metal as the layer 36. The secondary portion 58 extends over the element 42, into the cavity 46. The secondary portion 58 forms a conductive ring, surrounding the cavity 44. The secondary portion 58 thus extends over the walls of the cavity 46. The secondary portion 58 extends the height of one of the walls 48, 52, preferably the entire height of the wall 52, from the stack 24. The secondary portion 58 preferably extends into the cavity 46 over at least a portion of the base 50, i.e., the bottom of the cavity 46, preferably in the plane of the layer 54. The secondary portion 58 is therefore, in cross-sectional view, preferably L-shaped. The secondary portion therefore preferably comprises a leg directed towards the stack 24, and a leg directed towards the layer 54, for example coplanar with the layer 54.

The secondary portion 58 is coupled to the layer 36 by at least one conductive element 60, for example at least one conductive via or conductive ring. The at least one conductive element 60 extends through one or more insulating layers of the stack 24, so as to reach the layer 36. In other words, the at least one conductive element 60 is in contact with layer 36 and extends to the upper face of the stack 24. The secondary portion 58 rests in contact with the element 60 flush with the upper face of the stack 24.

The cavity 44 is filled with a material 56. The material has, for example, a dielectric permittivity of less than 20, preferably less than 10, more preferably less than 3, and for example greater than 1. The material 56 is, for example, air.

The cavity 46 is filled with a second material 47, preferably different from the first material filling the cavity 44. The second material has, for example, a dielectric permittivity of less than 20, preferably less than 10, more preferably less than 3, and for example greater than 1. The material 47 is, for example, air. Alternatively, the material 47 may be the same material as the material 56. Alternatively, the material 47 may be a conductive material.

The base 50 preferably has a thickness of less than 100 μm, preferably less than 50 μm. Preferably, the base 50 is as thin as possible while avoiding deformation of the element 42. The wall 48, extending from the base 50 to the stack 24, provides a stabilizer and ensures that the base 50 does not deform.

The layer 54 has a thickness of, for example, between 5 μm and 30 μm. The layer 58 has, for example, the same thickness as the layer 54. The layer 58 has a thickness of, for example, between 20 μm and 50 μm.

The layer 36 and the layer 40 are, for example, separated by a distance of between 250 μm and 400 μm, for example substantially equal to 350 μm. The distance between layer 54 and the layer 36 depends, for example, on the range of wavelengths transmitted or received by the antenna 14. For example, for the signals having a frequency substantially equal to 60 GHz, the distance between layer 54 and layer 36 is substantially equal to 400 μm. Preferably, the distance between the layer 54 and the layer 36 is greater than 150 μm, for example greater than 200 μm.

The distance between the layer 54 and layer 36 is an important characteristic of the antenna package. Indeed, the distance between the layer 54 and layer 36 must be high enough to allow layer 54 to radiate the transmitted signal. The layer 54 and the layer 36 are further separated by a material having characteristics, in particular a dielectric permittivity, allowing an efficient signal passage.

One could have chosen to form a layer of the material filling the cavity 44 on the stack and form the layer 54 on the layer. However, it might not be possible to select the thickness of the layer as precisely, according to how it is used.

Figure 2:
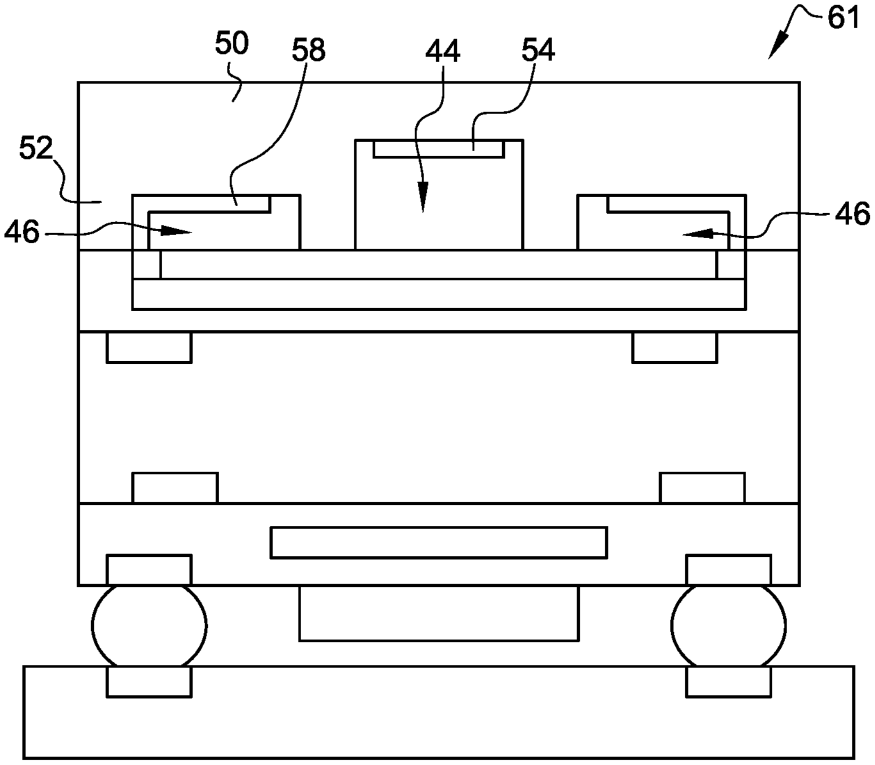
FIG. 2 is a cross-sectional view of another embodiment of an electronic device.

FIG. 2 is a cross-sectional view of another embodiment of an electronic device 61.

The device 61 differs from the device 10 of FIG. 1 in that the thickness of the base 50, facing the cavity 46, is different from the thickness of the base 50 facing the cavity 44, preferably greater than the thickness of the base 50 facing the cavity 44. In other words, the height of the cavity 46 is less than the height of the cavity 44. The upper surface of the base 50, i.e., the surface furthest from the cavities 44 and 46 is planar.

The layers 54 and 58 are located, in their respective cavities, as described in connection with FIG. 1. The layer 58 includes a leg extending over the wall 52 and a leg extending over the base 50 and thus not being in the same plane as the layer 54.

According to another embodiment, the leg of the layer 58 extending over the base 50 is coplanar with the layer 54 and the thickness of the base 50, facing the cavity 46, is different from the thickness of the base 50 facing the cavity 44, preferably greater than the thickness of the base 50 facing the cavity 44.

Figure 3:
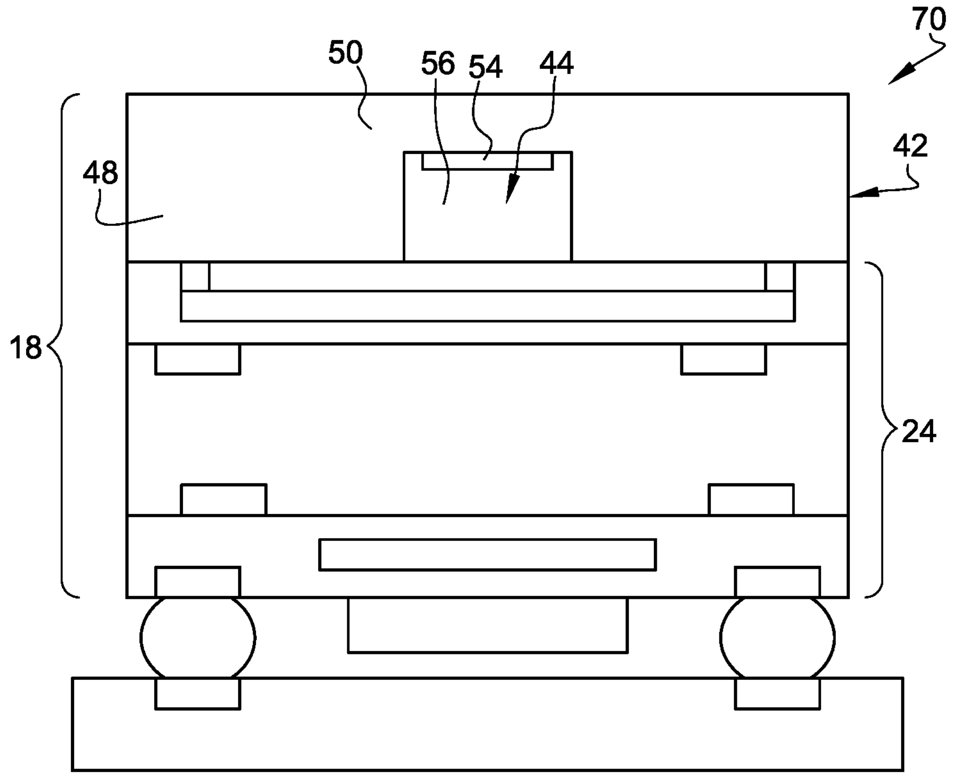
FIG. 3 is a cross-sectional view of another embodiment of an electronic device.

FIG. 3 is a cross-sectional view of another embodiment of an electronic device 70.

The device 70 differs from the embodiments of FIGS. 1 and 2 in that the device 70 does not comprise the cavity 46. Thus, the element 42 forms a single cavity 44. The cavity 44 comprises the layer 54 and the material 56, as described in relation to FIG. 1. The wall 48 laterally surrounding the cavity 44 forms the side wall of the element 42 and thus forms part of the side wall of the upper level 18. The element 42 thus corresponds to a block comprising a single cavity corresponding to the cavity 44. The wall 48 is thus coplanar with the side walls of the stack 24.

The stack 24 preferably does not comprise the conductive element 60. The antenna 14 does not comprise the secondary portion 58.

Figure 4:
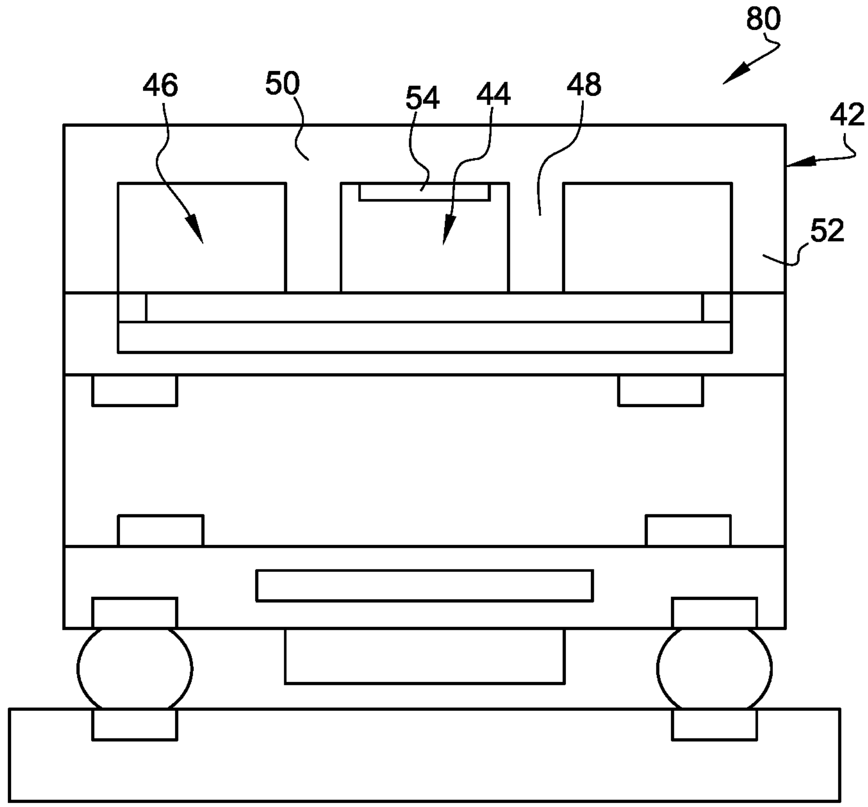
FIG. 4 is a cross-sectional view of another embodiment of an electronic device.

FIG. 4 is a cross-sectional view of another embodiment of an electronic device 80.

The device 80 differs from the embodiment of FIG. 1 in that the secondary portion 58 is not present in the cavity 46. Therefore, the cavity 46 comprises only the material 47.

As in the embodiment of FIG. 3, the conductive element 60 is not present.

Figure 5:
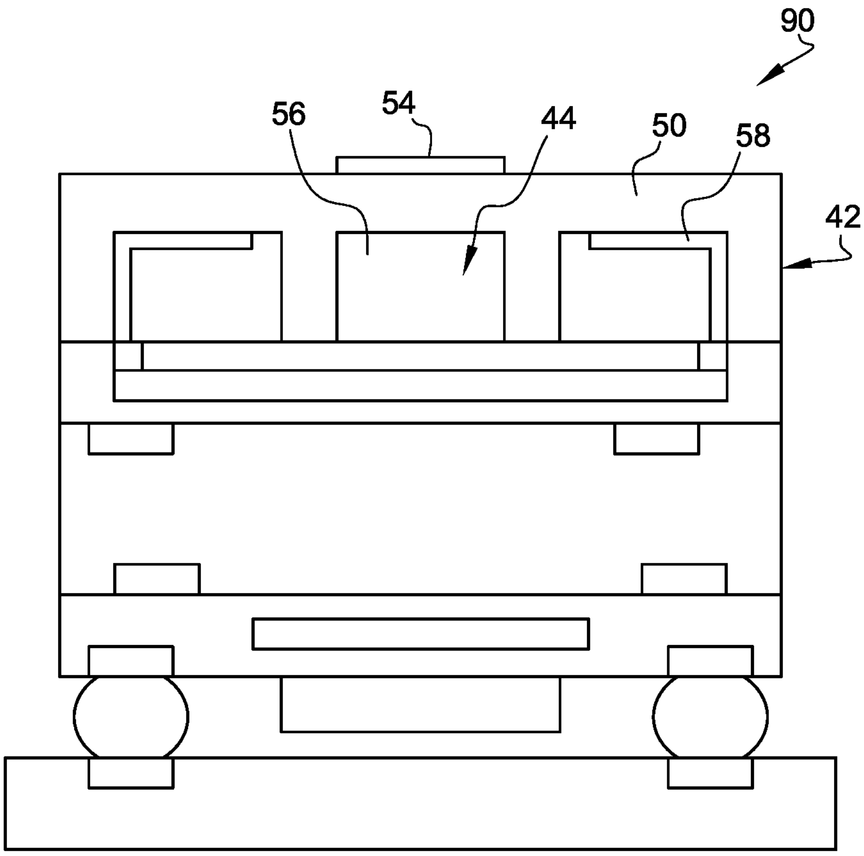
FIG. 5 is a cross-sectional view of another embodiment of an electronic device.

FIG. 5 is a cross-sectional view of another embodiment of an electronic device 90.

The device 90 differs from the embodiment of FIG. 1 in that the layer 54 is located on the upper face of the base 50, i.e., the upper face of the element 42. The layer 54 is located opposite the cavity 44. The layer 54 has, for example, in the horizontal plane, dimensions less than or equal to the dimensions of the cavity 44. The cavity 44 is thus filled only with the material 56. The secondary portion 58 is thus located in a plane different from the plane comprising the layer 54. In particular, the leg of the secondary portion 58 resting on the base 50 is not coplanar with the layer 54.

Figure 6:
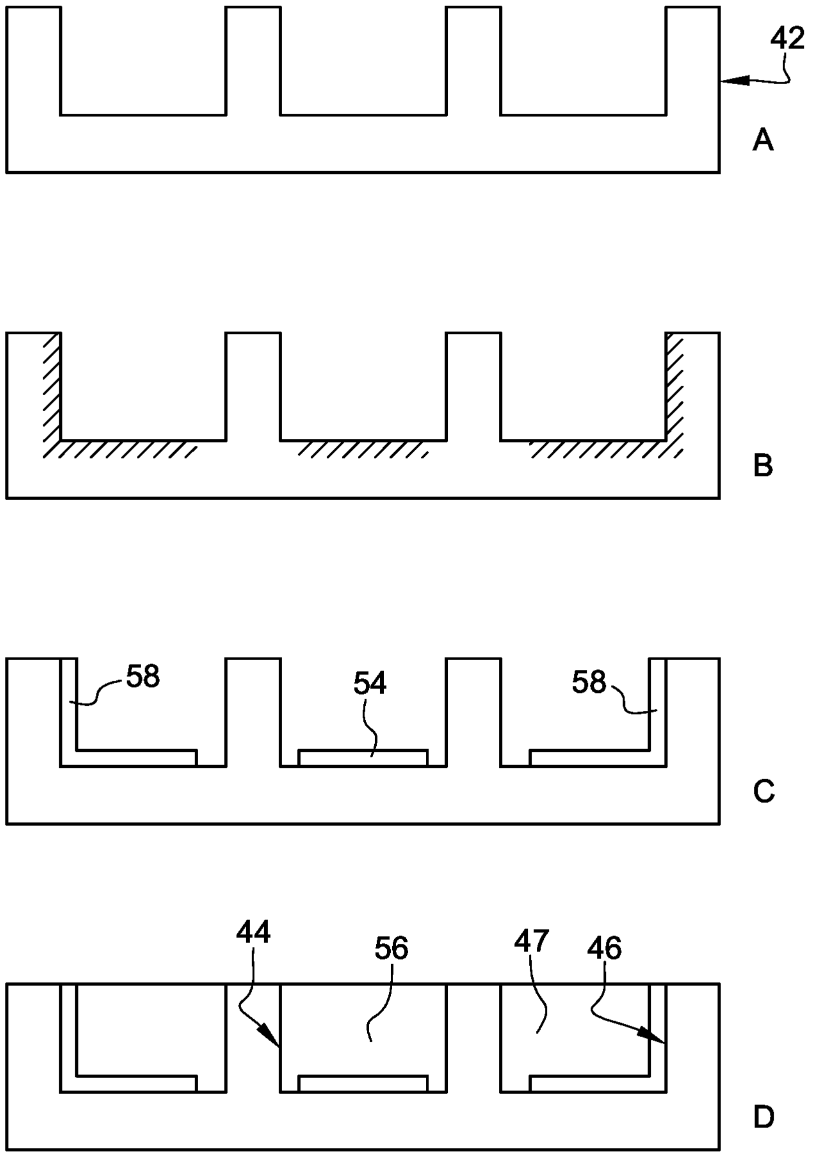
FIG. 6 represents an example of a method for manufacturing a portion of the embodiment of FIG. 1.

FIG. 6 shows an example method for manufacturing a portion of the embodiment of FIG. 1. More specifically, FIG. 6 comprises four cross-sectional views A, B, C, and D, each illustrating a step in the method for manufacturing a portion of the embodiment of FIG. 1. The steps illustrated by views A, B, C and D are preferably successive.

View A of FIG. 6 illustrates a step during which the element 42, or cover, is formed. Preferably, the element 42 is formed by injecting the material constituting the element 42 into a mold having the desired shape of the element 42. The injection is done, for example, by a syringe or by a suitable element, for example as part of the machine for manufacturing the element 42. The material constituting the element 42 is, during the injection, preferably in liquid form. The material is then brought to a solid phase, for example by annealing, i.e. by increasing its temperature. The mold is then removed.

The material constituting the element 42 is a plastic. The material constituting the element 42 is preferably a material compatible with a laser direct structuring (LDS) method, in other words, a thermoplastic material, doped with a non-conductive metallic inorganic compound.

View B of FIG. 6 illustrates the laser activation of layer locations 54 and 58 to create a base for metallization of these locations.

During the step illustrated in View C of FIG. 6, the element 42 is placed in an electroless plating bath composition. As a result, layers 54 and 58 are formed at the locations activated in the step of View B of FIG. 6.

Alternatively, the locations activated in the view B of FIG. 6 step are larger than the layers 54 and 58. Thus, the step of view C of FIG. 6 allows for the formation of metal layers having dimensions greater than the dimensions of layers 54 and 58. These layers are then etched to form layers 54 and 58.

In the step of view D of FIG. 6, the cavities 44 and 46 are filled with the materials 56 and 47, respectively. For example, the materials are deposited in liquid form in the cavities and solidified, for example by an annealing step.

In a subsequent non-illustrated step, the element 42 is attached to the stack 24.

FIG. 6 illustrates the manufacture of the embodiment of FIG. 1. However, the method described is applicable to the embodiments of FIGS. 2 to 5, by modifying the shape of the mold illustrated in view A of FIG. 6 and by modifying the laser-activated locations of the step in view B of FIG. 6.

The steps B and C of FIG. 6, corresponding to the direct laser structuring method, may be replaced by other metal layer deposition steps, for example a sputtering step or a spray painting step. The material of the element 42 may then be different from the materials discussed in connection with view A of FIG. 6. The element 42 may then be made of any plastic material suitable for forming the element 42 and for depositing metal layers.

An advantage of the described embodiments is that it is possible to better control the distance between the radiating conductive layer 54, otherwise known as the "patch", and the excitation layer 36. It is thus advantageously possible to decrease this distance, so as to decrease the size of the package, while maintaining a sufficient distance for the operation of the antenna.

Another advantage of the described embodiments is that it allows to separate the layer 54 and the layer 36 by the material 56, independently of the type of structure. Indeed, the structure is held by the plastic element or cover 42 and the strength of the material 56 does not impact the strength of the package.

Another advantage of the described embodiments is that it is possible to choose the material 47, surrounding the layer 58, and the material 56 surrounding the layer 54 which are different from each other.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

The invention claimed is:

1. A package, comprising:
an upper level including:
a stack comprising insulating layers and conductive elements;
a plastic element having a first side resting on the stack, a second side opposite the first side, and including a first cavity extending into the plastic element from said first side with a first height that is less than a thickness of the plastic element between the first and second sides; and
an antenna, comprising a first conductive track in the stack and a second conductive track on a wall of the plastic element.

2. The package according to claim 1, wherein the first cavity has a side plastic surface and a bottom plastic surface and wherein said second conductive track is located on the bottom plastic surface of the first cavity.

3. The package according to claim 2, wherein the first cavity is filled with a first material having a dielectric permittivity less than 20.

4. The package according to claim 1, wherein said second conductive track is located over the first cavity on the second side of the plastic element.

5. A package comprising:
an upper level including:
a stack comprising insulating layers and conductive elements;
a plastic element having a first side resting on the stack, a second side opposite the first side, and including a first cavity extending into the plastic element from said first side with a first height that is less than a thickness of the plastic element between the first and second sides; and
an antenna, comprising a first conductive track in the stack and a second conductive track on a wall of the plastic element;
wherein the plastic element further includes a second cavity extending into the plastic element from said first side with a second height that is less than said thickness of the plastic element between the first and second sides, said second cavity surrounding the first cavity.

6. The package according to claim 5, wherein the second cavity is separated from the first cavity by a first wall extending for the first height of the first cavity and resting on the stack.

7. The package according to claim 5, wherein the antenna further comprises a third conductive track located within the second cavity.

8. The package according to claim 7, wherein said third conductive track comprises a first portion extending on a side wall of the second cavity and a second portion extending on a bottom of the second cavity.

9. The package according to claim 8, wherein said second conductive track is located at a bottom of the first cavity and wherein the second portion of the third conductive track is coplanar with the second conductive track.

10. The package according to claim 8, wherein said second conductive track is located at a bottom of the first cavity and wherein the second portion of the third conductive track extends in a plane different from a plane of the second conductive track.

11. The package according to claim 7, wherein the third conductive track is electrically coupled to the first conductive track.

12. The package according to claim 5, wherein the first cavity is filled with a first dielectric material and wherein the second cavity is filled with a second dielectric material different from the first dielectric material.

13. A package further comprising:
an upper level including:
a stack comprising insulating layers and conductive elements;
a plastic element having a first side resting on the stack, a second side opposite the first side, and including a first cavity extending into the plastic element from said first side with a first height that is less than a thickness of the plastic element between the first and second sides; and an antenna, comprising a first conductive track in the stack and a second conductive track on a wall of the plastic element a lower level;

wherein the upper level is attached to the lower level by electrical connecting elements;

wherein a third cavity is defined between the upper level and the lower level and surrounded by said electrical connecting elements; and an integrated circuit chip located within the third cavity and electrically connected to the antenna.

14. The package according to claim 13, further comprising a fourth conductive track extending into the stack between the first conductive track and the third cavity.

15. The package according to claim 1, wherein the plastic element is made of a thermoplastic material that is doped with a non-conductive inorganic metal compound.

16. A method for manufacturing a package, comprising:

forming an upper level by:

forming a stack comprising insulating layers and conductive elements and including a first conductive track forming part of an antenna;

forming a plastic element having a first side and a second side opposite the first side, wherein forming the plastic element includes forming a first cavity extending into the plastic element from said first side with a first height that is less than a thickness of the plastic element between the first and second sides;

mounting the plastic element to the stack with the first side resting on the stack and the first cavity closed by the stack; and forming a second conductive track resting on a wall of the plastic element.

17. The method of claim 16, further comprising filling the first cavity with a first material having a dielectric permittivity less than 20.

18. A method comprising:

forming an upper level by:

forming a stack comprising insulating layers and conductive elements and including a first conductive track forming part of an antenna;

forming a plastic element having a first side and a second side opposite the first side, wherein forming the plastic element includes forming a first cavity extending into the plastic element from said first side with a first height that is less than a thickness of the plastic element between the first and second sides;

mounting the plastic element to the stack with the first side resting on the stack and the first cavity closed by the stack; and forming a second conductive track resting on a wall of the plastic element wherein forming the plastic element further includes forming a second cavity extending into the plastic element from said first side with a second height that is less than said thickness of the plastic element between the first and second sides, said second cavity surrounding the first cavity.

19. The method according to claim 18, further comprising forming a third conductive track extending along at least one wall of the second cavity.

20. The method according to claim 19, wherein the third conductive track comprises a first portion extending on a side wall of the second cavity and a second portion extending on a bottom of the second cavity.

21. The method according to claim 20, wherein the second conductive track extends on a bottom of the first cavity and the second portion of the third conductive track is coplanar with the second conductive track.

22. The method according to claim 20, wherein the second conductive track extends on a bottom of the first cavity and the second portion of the third conductive track extends in a plane different from a plane of the second conductive track.

23. The method according to claim 19, further comprising electrically coupling the third conductive track to the first conductive track.

24. The method according to claim 18, further comprising filling the first cavity with a first dielectric material and filling the second cavity with a second dielectric material different from the first dielectric material.

25. The method according to claim 24, wherein forming the plastic element comprises molding and wherein filling the first and second cavities with the first and second dielectric materials, respectively, occurs after molding.

26. A method comprising:

forming an upper level by:

forming a stack comprising insulating layers and conductive elements and including a first conductive track forming part of an antenna;

forming a plastic element having a first side and a second side opposite the first side, wherein forming the plastic element includes forming a first cavity extending into the plastic element from said first side with a first height that is less than a thickness of the plastic element between the first and second sides;

mounting the plastic element to the stack with the first side resting on the stack and the first cavity closed by the stack; and forming a second conductive track resting on a wall of the plastic element forming a lower level; and attaching the upper level to lower level, said attaching defining, between the upper level and the lower level, a third cavity.

27. The method according to claim 26, further comprising forming a fourth conductive track extending into the stack between the first conductive track and the third cavity.

28. The method of claim 16, wherein the plastic element is made of a thermoplastic material that is doped with a non-conductive inorganic metal compound.

29. The method according to claim 28, wherein forming the plastic element comprises performing a laser direct structuring operation.

30. The package according to claim 5, wherein said second conductive track is located at a bottom of the first cavity.

31. The package according to claim 30, wherein the first cavity is filled with a first material having a dielectric permittivity less than 20.

32. The package according to claim 5, wherein said second conductive track is located over the first cavity on the second side of the plastic element.

33. The package according to claim 5, wherein the plastic element is made of a thermoplastic material that is doped with a non-conductive inorganic metal compound.

34. The package according to claim 13, wherein said second conductive track is located at a bottom of the first cavity.

35. The package according to claim 34, wherein the first cavity is filled with a first material having a dielectric permittivity less than 20.

36. The package according to claim 13, wherein said second conductive track is located over the first cavity on the second side of the plastic element.

37. The package according to claim 13, wherein the plastic element is made of a thermoplastic material that is doped with a non-conductive inorganic metal compound.

38. The method of claim 18, further comprising filling the first cavity with a first material having a dielectric permittivity less than 20.

39. The method of claim 18, wherein the plastic element is made of a thermoplastic material that is doped with a non-conductive inorganic metal compound.

40. The method according to claim 39, wherein forming the plastic element comprises performing a laser direct structuring operation.

41. The method of claim 26, further comprising filling the first cavity with a first material having a dielectric permittivity less than 20.

42. The method of claim 26, wherein the plastic element is made of a thermoplastic material that is doped with a non-conductive inorganic metal compound.

43. The method according to claim 42, wherein forming the plastic element comprises performing a laser direct structuring operation.

* * * * *